United States Patent [19]

Eiben et al.

[11] Patent Number: 5,135,806
[45] Date of Patent: Aug. 4, 1992

[54] PROCESS FOR THE MANUFACTURE OF A SANDWICH LAMINATE AND THE RESULTANT SANDWICH LAMINATE

[75] Inventors: Robert Eiben, Cologne; Geert Christoph, Dormagen; Elke von Seggern, Leverkusen, all of Fed. Rep. of Germany

[73] Assignee: Bayer Aktiengesellschaft, Leverkusen Bayerwerk, Fed. Rep. of Germany

[21] Appl. No.: 819,028

[22] Filed: Jan. 10, 1992

[30] Foreign Application Priority Data

Jan. 18, 1991 [DE] Fed. Rep. of Germany ....... 4101373

[51] Int. Cl.$^5$ .............................................. B32B 3/26
[52] U.S. Cl. .................................... 428/304.4; 156/79; 264/46.4; 428/309.9; 428/319.1
[58] Field of Search .............. 428/304.4, 309.9, 319.1; 156/79; 264/46.4

[56] References Cited

U.S. PATENT DOCUMENTS

| | | | |
|---|---|---|---|
| 4,136,223 | 1/1979 | Harder | 428/309.9 |
| 4,379,103 | 4/1983 | Doerfling | 428/309.9 |
| 4,698,258 | 10/1987 | Harkins, Jr. | 428/319.1 |

Primary Examiner—William J. Van Balen
Attorney, Agent, or Firm—Joseph C. Gil

[57] ABSTRACT

Sandwich laminates capable of withstanding high stresses, especially skis, can be manufactured by covering the wall of a mold cavity with a wet laminate, laying extremely fine glass fiber paper thereon and after closure of the mold introducing into the mold cavity a reaction mixture forming a rigid foamed plastic, which cures to a rigid foam core.

6 Claims, 1 Drawing Sheet

PROCESS FOR THE MANUFACTURE OF A SANDWICH LAMINATE AND THE RESULTANT SANDWICH LAMINATE

BACKGROUND OF THE INVENTION

The present invention relates to a process for the manufacture of sandwich laminates by applying a wet laminate of an uncured resin-impregnated glass mat to the wall of a mold cavity and introducing into the closed mold cavity a free-flowing reaction mixture forming a rigid foamed plastic. The invention is also directed to the sandwich laminates so-produced. The laminates of the present invention are particularly useful as skis.

It is known to manufacture sandwich laminates, and especially skis, by introducing a dry laminate and other inserted parts into a mold cavity. After the mold is closed, a reaction mixture which forms a rigid foamed plastic, especially polyurethane-based, or a polystyrene granular material is introduced into the mold and allowed to expand to a rigid foamed plastic core. The adhesion between laminate and rigid foamed plastic core is not particularly good, so that this process cannot be used for manufacturing highly stressed sandwich laminates.

According to another known process a wet laminate is built up around a prefabricated rigid foam plastic core to form a composite which is then molded. This procedure, which is associated with much manual work, is very expensive. The adhesion of the laminate to the foamed plastic core depends on manual skills.

If a wet laminate were used with a foamable reaction mixture, there is also a risk that the reaction mixture would mix with the wet laminate, i.e., the wet laminate would become permeated. As a result, the desired laminate layer would become weakened, even though there would presumably be a very good adhesion between the foamed plastic core and the laminate.

The problem exists of discovering a process wherein the laminate survives as a separate layer and flows well round inserts which may be present during the molding. In addition, a good adhesion must develop in the finished part between foamed plastic core and laminate, and the finished part must be able to withstand quite high stress.

DESCRIPTION OF THE INVENTION

Figure 1:
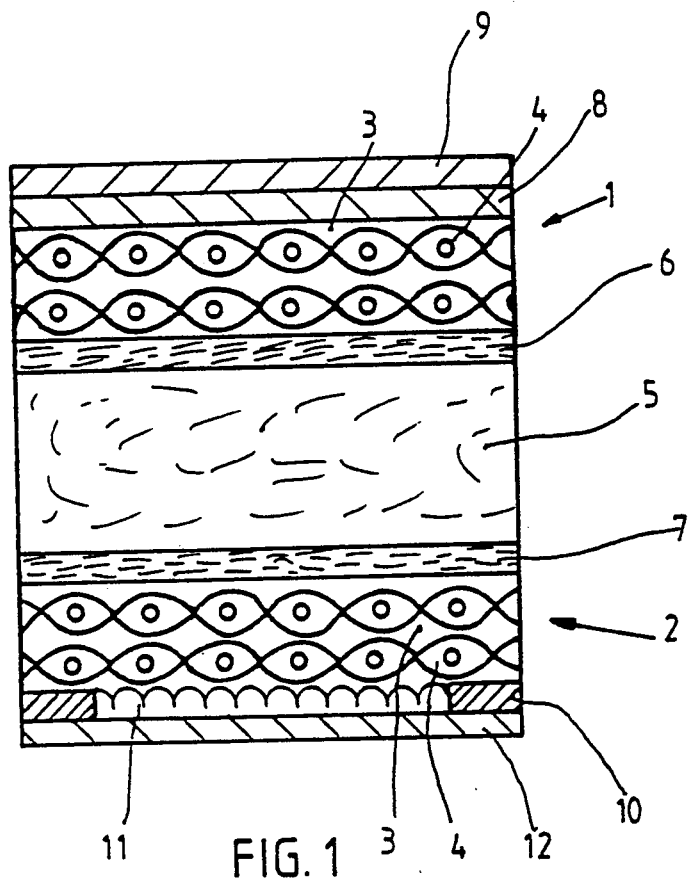
FIG. 1 shows the structure of the sandwich laminate in section according to one embodiment of the present invention.

Surprisingly, the above noted problem is solved by laying an extremely fine glass paper of pressed extremely fine glass fibers on the wet laminate before introducing the foamable reaction mixture. In this way, upon expansion of the reaction mixture through the extremely fine glass fiber paper, the wet laminate and the reaction mixture or the foamed plastic remain separated. The wet laminate is molded by the pressure caused by the expansion of the foamable reaction mixture. As a result of this pressure, the resin of the wet laminate flows well around any inserts which may be present, such as steel edges, spacers and the like. This process is further improved by heating the mold.

As a result of the pressure caused by the expansion of the foamable mixture, the extremely fine glass fiber paper experiences on one side good wetting by the wet laminate and on the other side good wetting by the reaction mixture, so that curing results in very good adhesion which withstands even quite high stresses, such as arise for example with downhill skis or slalom skis. This extremely fine glass paper has nothing in common with the reinforcing intermediate layers of glass fiber mats, weaves, non-wovens or the like, such as can be embedded in the matrix of the laminate. Such extremely fine glass fiber papers can be manufactured by pressing without a binder. Preferred is an extremely fine glass fiber paper with a weight per unit area of 50 to 100 $g/m^2$ at a thickness of 0.2 to 0.8 mm and a fiber thickness of 0.2 to 3.0 $\mu$m.

One extremely fine glass fiber paper whose use is particularly preferred has a weight per unit area of 60 to 85 $g/m^2$ at a thickness of 0.4 to 0.6 mm and a fiber thickness of 0.5 to 2.0 $\mu$m.

Such extremely fine glass fiber papers have the property that they cannot be permeated either by the wet laminate or by the reaction mixture. On the other hand they permit both to penetrate to a sufficient depth to adhere well. They transfer the pressure developing as a result of the expansion of the reaction mixture very well to the wet laminate, so that the resin of the wet laminate flows around any inserts present.

The new sandwich laminate, especially a ski, starts from a foamed plastic core foamed in situ, with a facing formed from a wet laminate on each side. The laminate can contain inserts, such as steel edges and the like, and the laminate can also have a decorative layer on the visible side.

The novelty of the present invention resides in disposing an extremely fine glass fiber paper that between the wet laminate and the rigid foamed plastic core. The fiber paper adheres firmly both to the wet laminate and to the rigid foamed plastic core.

The drawing shows, purely diagrammatically, the structure of the sandwich laminate in section in the embodiment of a ski. Between two facings 1, 2 of a laminate made of a polyester resin matrix 3 or a polyurethane wet laminate with embedded glass fiber mats 4, a core 5 of polyurethane rigid foamed plastic is disposed. Between the core 5 and each of the laminate facings 1, 2 there is disposed an extremely fine glass fiber paper 6, 7 with a weight per unit area of 70 $g/m^2$ at a thickness of 0.5 mm and a fiber thickness of 1.25 $\mu$m. It is stuck firmly to the facings 1, 2 and the core 5. On the facing 1 there is disposed in addition a steel insert 8 for anchorage of the ski binding as well as a decorative film 9. Embedded in the facing 2 in addition are steel edges 10 as well as a reinforcement 11 of carbon fibers. The facing 2 is likewise covered with a decorative film 12, but this is of polycarbonate.

For better clarity the thicknesses of the various layers and of the core are not shown in the correct ratio, and inserted parts have been omitted.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the manufacture of sandwich laminates by applying a wet laminate of an uncured resin-impregnated glass mat to the wall of a mold cavity, introducing a free-flowing reaction mixture which forms a rigid plastic foam into the closed mold cavity, closing the mold, and allowing the resin to cure and the reaction mixture to fully react, the improvement wherein before the introduction of the reaction mixture, an extremely fine glass fiber paper of pressed extremely fine glass fibers is laid onto the wet laminate.

2. The process of claim 1, wherein said glass fiber paper has a weight per unit area of 50 to 100 g/m² at a thickness of 0.2 to 0.8 mm and a fiber thickness of 0.2 to 3.0 μm.

3. The process of claim 2, wherein said glass fiber paper has a weight per unit area of 60 to 85 g/m² at a thickness of 0.4 to 0.6 mm and a fiber thickness of 0.5 to 2.0 μm.

4. A sandwich laminate comprising an in-situ foamed rigid foamed plastic core with facings of a wet laminate on both sides, and an extremely fine glass fiber paper adhering firmly both to the facings, and to the rigid foamed plastic core.

5. The sandwich laminate of claim 4, wherein said glass fiber paper has a weight per unit area of 50 to 100 g/m² at a thickness of 0.2 to 0.8 mm and a fiber thickness of 0.2 to 3.0 μm.

6. The sandwich laminate of claim 5, wherein said glass fiber paper has a weight per unit area of 60 to 85 g/m² at a thickness of 0.4 to 0.6 mm and a fiber thickness of 0.5 to 2.0 μm.

* * * * *